US007734543B2

(12) United States Patent
Braco

(10) Patent No.: US 7,734,543 B2
(45) Date of Patent: Jun. 8, 2010

(54) ELECTRONIC BILL PRESENTMENT AND PAYMENT SYSTEM

(75) Inventor: Ronald A. Braco, Warren, NJ (US)

(73) Assignee: Metavante Corporation, Brown Deer, WI (US)

( * ) Notice: Subject to any disclaimer, the term of this patent is extended or adjusted under 35 U.S.C. 154(b) by 2262 days.

(21) Appl. No.: 09/852,119

(22) Filed: May 9, 2001

(65) Prior Publication Data

US 2002/0002536 A1 Jan. 3, 2002

Related U.S. Application Data

(60) Provisional application No. 60/203,038, filed on May 9, 2000.

(51) Int. Cl.
G06Q 40/00 (2006.01)
(52) U.S. Cl. .......................................... 705/40; 705/39
(58) Field of Classification Search .................. 705/40, 705/27, 34, 39, 43, 35
See application file for complete search history.

(56) References Cited

U.S. PATENT DOCUMENTS

| 3,833,885 | A | 9/1974 | Gentile et al. |
| 4,277,837 | A | 7/1981 | Stuckert |
| 4,315,101 | A | 2/1982 | Atalla |
| 4,317,957 | A | 3/1982 | Sendrow |
| 4,319,336 | A | 3/1982 | Anderson et al. |
| 4,420,751 | A | 12/1983 | Paganini et al. |
| 4,454,414 | A | 6/1984 | Benton |

(Continued)

FOREIGN PATENT DOCUMENTS

EP 1020824 A2 7/2000

(Continued)

OTHER PUBLICATIONS

Hallerman, David (Banks strike back with an E-Bill challenge, Bank Technology news, PITEM99221005, Aug. 1999).*

(Continued)

Primary Examiner—Ojo O Oyebisi
(74) Attorney, Agent, or Firm—Reinhart Boerner Van Deuren S.C.

(57) ABSTRACT

A switching system for the electronic presentment and payment of bills between a Consumer and a Biller. The system includes an open, interoperable switching network for routing bill summary information between a Biller and a Consumer. Bill summary files are generated by a Bill Service Provider. Consumer Service Providers poll the Bill Service Providers through the switching network for newly generated bill summary files. The bill summary files are routed through the switching network to the appropriate Consumer Service Provider. Customers of the Consumer Service Provider log on to the web site of the Consumer Service Provider to access bill summary data. In addition to viewing the bill summary files electronically, the Consumer can initiate electronic payment of previously presented bills or bills that have not been presented electronically. Accounts of the Billers and Consumers are settled periodically by the switching network and reports are generated of the historical transactional activity of the exchanges over the network. Detailed information concerning a bill is accessible by the consumer only via a direct communication with the Biller, e.g., a hyperlink to the web site of the Biller, not via the switching network.

29 Claims, 5 Drawing Sheets

U.S. PATENT DOCUMENTS

| | | |
|---|---|---|
| 4,460,960 A | 7/1984 | Anderson et al. |
| 4,634,845 A | 1/1987 | Hale et al. |
| 4,678,895 A | 7/1987 | Tateisi et al. |
| 4,689,478 A | 8/1987 | Hale et al. |
| 4,695,880 A | 9/1987 | Johnson et al. |
| 4,727,243 A | 2/1988 | Savar |
| 4,734,858 A | 3/1988 | Schlafly |
| 4,799,156 A | 1/1989 | Shavit et al. |
| 4,823,264 A | 4/1989 | Deming |
| 4,947,028 A | 8/1990 | Gorog |
| 5,007,084 A | 4/1991 | Materna et al. |
| 5,025,373 A | 6/1991 | Keyser, Jr. et al. |
| 5,220,501 A | 6/1993 | Lawlor et al. |
| 5,231,571 A | 7/1993 | D'Agostino |
| 5,265,033 A | 11/1993 | Vajk et al. |
| 5,283,829 A | 2/1994 | Anderson |
| 5,287,270 A | 2/1994 | Hardy et al. |
| 5,325,290 A | 6/1994 | Cauffman et al. |
| 5,326,959 A | 7/1994 | Perazza |
| 5,336,870 A | 8/1994 | Hughes et al. |
| 5,341,429 A | 8/1994 | Stringer et al. |
| 5,347,632 A | 9/1994 | Filepp et al. |
| 5,383,113 A | 1/1995 | Kight et al. |
| 5,420,405 A | 5/1995 | Chasek |
| 5,424,938 A | 6/1995 | Wagner et al. |
| 5,465,206 A | 11/1995 | Hilt et al. |
| 5,473,143 A | 12/1995 | Vak et al. |
| 5,483,445 A | 1/1996 | Pickering |
| 5,594,910 A | 1/1997 | Filepp et al. |
| 5,649,117 A | 7/1997 | Landry |
| 5,655,089 A | 8/1997 | Bucci |
| 5,699,528 A | 12/1997 | Hogan |
| 5,710,887 A | 1/1998 | Chelliah et al. |
| 5,710,889 A | 1/1998 | Clark et al. |
| 5,717,868 A | 2/1998 | James |
| 5,727,129 A | 3/1998 | Barrett et al. |
| 5,727,249 A | 3/1998 | Pollin |
| 5,729,693 A | 3/1998 | Holda-Fleck ............... 395/214 |
| 5,745,886 A | 4/1998 | Rosen |
| 5,754,939 A | 5/1998 | Herz et al. |
| 5,787,403 A | 7/1998 | Randle |
| 5,815,665 A | 9/1998 | Teper et al. |
| 5,826,242 A | 10/1998 | Montulli |
| 5,832,460 A | 11/1998 | Bednar et al. |
| 5,845,267 A | 12/1998 | Ronen |
| 5,848,396 A | 12/1998 | Gerace |
| 5,848,400 A | 12/1998 | Chang |
| 5,857,190 A | 1/1999 | Brown |
| 5,870,559 A | 2/1999 | Leshem et al. |
| 5,870,724 A | 2/1999 | Lawlor et al. |
| 5,873,072 A | 2/1999 | Kight et al. |
| 5,884,288 A | 3/1999 | Chang et al. |
| 5,884,290 A | 3/1999 | Smorodinsky et al. |
| 5,890,140 A | 3/1999 | Clark et al. |
| 5,903,721 A | 5/1999 | Sixtus |
| 5,903,732 A | 5/1999 | Reed et al. |
| 5,905,976 A | 5/1999 | Mjolsnes et al. |
| 5,920,847 A | 7/1999 | Kolling et al. |
| 5,930,759 A | 7/1999 | Moore et al. |
| 5,943,656 A | 8/1999 | Crooks et al. |
| 5,956,693 A | 9/1999 | Geerlings |
| 5,956,695 A | 9/1999 | Carrithers et al. |
| 5,956,700 A | 9/1999 | Landry |
| 5,963,925 A | 10/1999 | Kolling et al. |
| 5,974,146 A | 10/1999 | Randle et al. |
| 5,978,780 A | 11/1999 | Watson |
| 5,987,440 A | 11/1999 | O'Neil et al. |
| 6,000,033 A | 12/1999 | Kelley et al. |
| 6,006,333 A | 12/1999 | Nielsen |
| 6,029,151 A | 2/2000 | Nikander |
| 6,032,133 A | 2/2000 | Hilt et al. |
| 6,038,597 A | 3/2000 | Van Wyngarden |
| 6,044,362 A | 3/2000 | Neely |
| 6,049,786 A | 4/2000 | Smorodinsky ............... 705/40 |
| 6,052,457 A | 4/2000 | Abdelaal et al. ............ 379/220 |
| 6,052,730 A | 4/2000 | Felciano et al. |
| 6,055,567 A | 4/2000 | Ganesan et al. |
| 6,058,380 A | 5/2000 | Anderson et al. |
| 6,065,012 A | 5/2000 | Balsara et al. |
| 6,070,150 A | 5/2000 | Remington et al. |
| 6,072,870 A | 6/2000 | Nguyen et al. |
| 6,078,907 A | 6/2000 | Lamm |
| 6,085,177 A | 7/2000 | Semple et al. |
| 6,085,191 A | 7/2000 | Fisher et al. |
| 6,097,834 A | 8/2000 | Krouse et al. |
| 6,098,053 A | 8/2000 | Slater |
| 6,119,106 A | 9/2000 | Mersky et al. |
| 6,119,107 A | 9/2000 | Polk |
| 6,119,109 A | 9/2000 | Muratani et al. |
| 6,122,625 A | 9/2000 | Rosen |
| 6,128,603 A | 10/2000 | Dent et al. |
| 6,173,272 B1 | 1/2001 | Thomas et al. |
| 6,178,511 B1 | 1/2001 | Cohen et al. |
| 6,182,052 B1 | 1/2001 | Fulton et al. |
| 6,199,077 B1 | 3/2001 | Inala et al. |
| 6,253,203 B1 | 6/2001 | O'Flaherty et al. |
| 6,275,824 B1 | 8/2001 | O'Flaherty et al. |
| 6,289,322 B1 | 9/2001 | Kitchen et al. |
| 6,292,789 B1 | 9/2001 | Schutzer |
| 6,327,577 B1 | 12/2001 | Garrison et al. |
| 6,334,116 B1 | 12/2001 | Ganesan et al. |
| 6,363,362 B1 | 3/2002 | Burfield et al. |
| 6,381,584 B1 | 4/2002 | Ogram |
| 6,393,407 B1 | 5/2002 | Middleton, III et al. |
| 6,412,073 B1 | 6/2002 | Rangan |
| 6,446,119 B1 | 9/2002 | Olah et al. |
| 2001/0002535 A1 | 6/2001 | Liebig et al. |
| 2001/0037296 A1 | 11/2001 | Ganesan et al. |
| 2001/0044776 A1 | 11/2001 | Kight et al. |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0062282 A1 | 5/2002 | Kight et al. |
| 2002/0065773 A1 | 5/2002 | Kight et al. |
| 2002/0087427 A1 | 7/2002 | Ganesan et al. |
| 2002/0087461 A1 | 7/2002 | Ganesan et al. |
| 2002/0087465 A1 | 7/2002 | Ganesan et al. |
| 2002/0087468 A1 | 7/2002 | Ganesan et al. |
| 2002/0087469 A1 | 7/2002 | Ganesan et al. |
| 2002/0087471 A1 | 7/2002 | Ganesan et al. |
| 2002/0194125 A1 | 12/2002 | Shimada |

FOREIGN PATENT DOCUMENTS

| | | |
|---|---|---|
| EP | 1043668 A2 | 10/2000 |
| EP | 1049056 A2 * | 11/2000 |
| EP | 1052603 A2 | 11/2000 |
| EP | 1083532 A2 | 3/2001 |
| EP | 1091330 A2 | 4/2001 |
| EP | 1111559 A2 | 6/2001 |
| EP | 1136922 A1 | 9/2001 |
| EP | 1136923 A1 | 9/2001 |
| EP | 1136924 A1 | 9/2001 |
| GB | 2294566 A | 5/1996 |
| WO | WO99/05628 | 2/1999 |
| WO | WO99/07102 | 2/1999 |
| WO | WO99/10823 | 3/1999 |
| WO | WO99/13421 | 3/1999 |

| WO | WO99/15999 | 4/1999 |
| WO | WO 99/18529 | 4/1999 |
| WO | WO99/42944 | 8/1999 |
| WO | WO99/58339 | 11/1999 |
| WO | WO00/42551 | 7/2000 |
| WO | WO00/48085 | 8/2000 |
| WO | WO01/77938 | 10/2001 |
| WO | WO 02/14985 | 2/2002 |

OTHER PUBLICATIONS

Sharon Osberg, "Wells Fargo: Standards-Based Electronic Bill Presentment and Payment (EBPP)", Nov. 1999, XP-002192923.
Stoneman, B., Fitting It All Together, Banking Strategies, Mar./Apr. 2000, vol. 76, No. 2, pp. 50-58.
Hallerman, D., Banks Strike Back With An E-Bill Challenge, Bank Technology News, Aug. 1999.
Anonymous, Non-Bank Puts E-Payments At ATMs to the Test, Bank Network News, May 1999.
Council for Electronic Billing and Payment, Business-to-Business EIPP: Presentment Models and Payment Options, Part One: Presentment Models, Jan. 2001, National Automated Clearing House Association, Herndon, VA.
Council for Electronic Billing and Payment, Business-to-Business EIPP: Presentment Models and Payment Options, Part Two: Payment Options, Jan. 2001. National Automated Clearing House Association, Herndon, VA.
Arald Jean-Charles and Suhas D. Joshi, Architectural Choices for OSS Integration, eAI Journal, Sep. 2001, pp. 59-63.
Interoperabill Initiative of the Banking Industry Technology Secretariat (BITS), Electronic Bill Presentment and Payment (EBPP) Business Practices, May 9, 2000, Edition 2.1, Draft for Comment, Council for Electronic Billing and Payment of the National Automated Clearing House Association (NACHA).
Business Practices Task Force of NACHA's Council for Electronic Billing and Payment, An Overview of Electronic Bill Presentment and Payment Operating Models: Process, Roles, Communications, and Transaction Flows, Apr. 9, 1999.
Pricewaterhousecoopers, Electronic Bill Presentment and Payment: A Primer, Zurich-Oerlikon.
James S. Diggs, Electronic Commerce and the Document: An Old Lexicon Re-Energized, Xploration Spring, 1997, pp. 26-29.
Netdelivery Corporation, EDM: Electronic Delivery Management: The Delivery Service for Electronic Commerce, Boulder, CO.
Robert Landry, Ian Rubin, Richard Bell, Retail Banking Delivery Technology: Channels in Transistion Financial Services Technology Conference, Apr. 27-28, 1998, The Tower Group, Newton, MA.
Robert Landry, Forecasting How U.S. Delivery Channels Will Play Out, FutureBanker, Aug. 1997, pp. 46-49.
Gary B., Meshell, A Perspective on Electronic Commerce and Payments, Price Waterhouse.
No Author Name Given, Visa-Home Banking & Bill Payment Solution, Visa Interactive.
No Author Name Given, Paysense: The Way Payments Will Be, Trisense Software, Ltd., Burnsville, MN.
Killen & Associates, Electronic Bill Presentment and Payments: Markets, Framework and Suppliers, vol. 1 of a 3 Study Set, Palo Alto, CA.
Thomas P. Vartanian, Future Banking: Reinventing the Bank As an Idea Factory, American Banker, Aug. 19, 1996.
Thomas P. Vartanian, Future Banking: Key Question for Emerging Systems: Where is the Money? American Banker, Jun. 17, 1996.
Charles G. Moody, III, From the Publisher: Outsourcing, American Waste Digest, Jul. 1998, p. 9.
No Author Name Given, Everyone's Knocking on Home Banking's Door, Business Week, Sep. 24, 2001.
No Author Name Given, Bill Gates is Rattling the Teller's Window, Business Week, Sep. 24, 2001.
No Author Name Given, Call it E-Money Management, Business Week, Sep. 24, 2001.
The Advisory Board Company, A Proposition Beyond Rescue: The Pure Play Advantage, 1996, pp. 41-72.
The Advisory Board Company, Chapter III: Creating New Payments Businesses, 1996, pp. 283-298.
The Advisory Board Company, VI: Creating New Payments Businesses, 1996, pp. 113-146.
ASC X12 Finance Subcommittee, Models for Consumer Billing and Payment Systems, Jun. 1995, Technical Report Type 2.
ASC X12 Finance Subcommittee, Models for Consumer Billing and Payment Systems, Oct. 1995, Technical Report Type II.
Michael C. McChesney, Banking in Cyberspace: an investment in itself, Banking/Investing, IEEE Spectrum, Feb. 1997, pp. 54-63.
No Author Name Given, Online Banking Report, Home Banking Partners, Issue 32, Dec. 1997.
Chip Wickenden, CCM, The Next Wave, Consumer EDI.
Just in Time Solutions, AT&T and Intuit, Open Internet Billing: White Paper, Jun. 1998.
David Lamm, The Effect of the Internet on Payment Processing, The Association for Work Process Improvement, Apr. 27, 1999, Boston, MA.
Leslie Thwaits, The Check's on the Net: CheckFree is Making Electronic Commerce Hassle Free, SourceBook, Apr. 1999, pp. 17-20, The Reddy Corporation International.
ASC X12 Finance Subcommittee, Reference Model for Addressing Financial Transactions, Technical Report Type 2, Jun. 1998.
VISA, Consumer Electronic Invoice Presentment: Not Your Everday EDI, SterlConf.
ASC X12 Finance Subcommittee, Consumer Service Provider Billing & Payment System Work Group, Meeting Notes from Jun. 1995 X12F Trimester Meeting, Sep. 1995.
VISA, Bill Interest in Electronic Remittance, Bill Payment Council Meeting, Oct. 17, 1994, Methesda, MD.
ASC X12 Finance Subcommittee, Models for Payment Systems, Technical Report Type 2, ASC X12 Procedures Review Board, Feb. 1995.
Richard K Crone, Screen Scraping: The Monster IBPP Wave You Absolutely Must Catch, IBPP Strategies and Trends, Dove Consulting.
Richard K. Crone, Unlocking Treasures Untold: The Revenue Generating Power of IBPP and Anonymous Profile Marketing, Dove Consulting.
A. Litan, The Consumer E-Billing Hype Cycle, Research Note, Dec. 19, 2000, GartnerGroup.
A. Litan, Consumer E-Billing Shakeout: The Dust Starts to Settle, Research Note Oct. 3, 2000, GartnerGroup.
K. Kerr and A. Litan, Trends in Bsuiness-to-Consumer Electronic Bill Presentment and Payment, Context Overview Report, Aug. 25, 2000, GartnerGroup.
A. Litan, Consumer E-Bill Payment: Built, but When Will They Come? Research Note. Feb. 18, 2000, GartnerGroup.
A. Litan, Three Banks Enter E-Billing Race with Post Office Model, Research Note, Jul. 15, 1999, GartnerGroup.
A. Litan, Future Bill Distribution: Internet Post Office Model, Research Note, Apr. 9, 1999, GartnerGroup.
Gaston Hummel, EBPP, Group 1 Software Europe, Ltd., Sep. 11, 2001.
Nicolette Lemmon, David Gourley and James Ward, Member Acceptance of Electronic Access Systems: Innovators versus Laggards, Center for Credit Union Research, University of Wisconsin-Madison School of Business and the Filene Research Institute, 1999.
Billserv, EBPP White Paper.
David B. Humphrey, Ph.D., Prospective Changes in Payment Systems: Implications for Credit Unions, Florida State University, Center for Credit Union Research, University of Wisconsin-Madison School of Business and the Filene Research Institute, 1997.
Jody Cornish and Octavio Marenzi, Scan and Pay Services: The Future of Electronic Bill Presentment Celent Communications, May 2000, Cambridge, MA.
Jody Cornish, Octavio Marenzi and Sang Lee, Banks and Electronic Bill Presentment: A Survey, Celent Communications, Apr. 2000, Cambridge, MA.
Avolent, Using BizCast to Capture ROI and Automate the Invoice-to-Pay Process, Avolent B2B White Paper, 2001, pp. 20-28.
Avolent, The Return on Investment of EIPP, Avolent B2B White Paper, pp. 14-19.

Avolent, Market Evolution for EIPP, Avolent B2B White Paper, pp. 10-13.

Greg Sward and Brian Valente, Successfully Automating the Invoice-to-Pay Process, Avolent B2B White Paper, Feb. 2001, pp. 1-9.

No Author Name Given, Non-Bank Puts E-Payments At ATMs To The Test, Bank Network News, May 1999.

* cited by examiner

ELECTRONIC BILL PRESENTMENT AND PAYMENT SYSTEM

CROSS-REFERENCE TO RELATED APPLICATIONS

This application claims the benefit of U.S. Provisional Application No. 60/203,038, filed on May 9, 2000, which is hereby incorporated by reference in its entirety.

BACKGROUND OF THE INVENTION

1. Field of the Invention

The present invention is directed to electronic bill presentment and payment (EBPP) and in particular, to an improved consolidated and flexible system for presentment and/or payment of bills electronically over a network.

2. Description of Related Art

Approximately one third of all Billers offer their customers electronic bill presentment (EBP). In the near future every Biller will want to offer their customers this feature in order to provide enhanced customer service, obtain greater customer loyalty, and reduce overall processing costs.

By 2002, it is predicted that approximately 26 million households in the United States will bank, invest or manage their finances on line with a great majority of such users receiving their bill presentment electronically. As the market for electronic EBP services grows Consumers see value in electronically consolidated and presented bill summaries at their on-line banking site, while Billers see advantages to the elimination of paper bills and the ability to reach many consumers through a single consolidated system.

Heretofore, many banks and other financial institutions have offered its customers a closed proprietary on-line banking system in which the financial institution presents and pays bills only through their institution. Thus, the Biller is required to transact all business through the financial institution.

Consumers have relationships with multiple Billers, only a few of which are likely to be wholesale customers of a given Consumer's financial institution. It is desirable to provide an electronic bill presentment and payment system by which Consumers can access and pay a greater number of bills thereby enhancing the financial institution's on-line banking service.

It is therefore desirable to provide a consolidated open, interoperable switching system for electronic presentment and payment of bills electronically between one or more Consumers and Billers.

SUMMARY OF THE INVENTION

For the purposes of the present invention the following terms will be defined as follows:

"Consumer" is defined as any individual or entity that purchases a good or service.

"Biller" is defined as any individual or entity to be paid a fee for a good or service supplied to a Consumer.

"Consumer Service Provider" (CSP) is an individual, company, financial institution or their affiliates, or any other entity that presents bill summary data in electronic form for ultimate distribution to their respective customers.

"Consumer Payment Provider" (CPP) is an individual, company, or any other entity that provides payment processing using electronic and/or paper payment capabilities, to execute payment instructions initiated by the Consumer.

"Biller Service Provider" (BSP) is an individual, a company, a financial institution, or any other entity that generates a bill summary file for goods or services rendered or consolidates bill summary files received from Billers.

"Bill Payment Provider" (BPP) is an individual, a company, or any other entity that receives and consolidates consumer payments on behalf of the Biller and provides an electronic and/or paper for payment posting by the Biller.

"Participants" includes any CSP, BSP, or Biller that registers to access the switching system in accordance with the present invention. Participation is not restricted to any Consumer, Biller, or financial institution.

"Payee" is an individual, a company, a financial institution, or any other entity that serves as a remittance center or location on behalf of the Biller.

An object of the present invention is to develop a switching system for electronic presentment and payment of bills of a network that is not related to a particular CSP or BSP.

Another object of the present invention is to provide a switching system for the presentment and payment of bills electronically to be used by Participants without having to modify their existing technology.

A further object of the present invention is to develop a switching system for electronic presentment and payment of bills that employs a net settlement system for tallying the total credits and debits at the end of a cut-off period instead of processing each transaction thereby saving processing costs.

Still another object of the present invention is to develop a universal switching system for electronic presentment and payment of bills that allows any BSP and CSP to participate. As a result Consumers have one stop presentment and payment of all of their bills at a single location, while Billers can use a single system to send their bills to all of their customers. In addition, Billers are able to present their bills at all CSP participants, and CSPs, even those of smaller size institutions, have access to all BSPs.

The present invention relates to a switching system for the electronic presentment and payment of bills between a Consumer and a Biller. The system includes an open, interoperable switching network for routing bill summary information between a Biller and a Consumer. Bill summary files are generated by a Bill Service Provider. Consumer Service Providers poll the Bill Service Providers through the switching network for newly generated bill summary files. The bill summary files are routed through the switching network to the appropriate Consumer Service Provider. Customers of the Consumer Service Provider log on to the web site of the Consumer Service Provider to access bill summary data. In addition to viewing the bill summary files electronically, the Consumer can initiate electronic payment of previously presented bills or bills that have not been presented electronically. Accounts of the Billers and Consumers are settled periodically by the switching network and reports are generated of the historical transactional activity of the exchanges over the network. Detailed information concerning a bill is accessible by the consumer only via a direct communication with the Biller, e.g., a hyperlink to the web site of the Biller, not via the switching network.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

The present invention is directed to a switching system 100 that facilitates presentment, payment and settlement of bills among Consumers and Billers via a network such as the Internet, World Wide Web, Local Area Network, Wide Area Network, or any other communication network.

Figure 1:
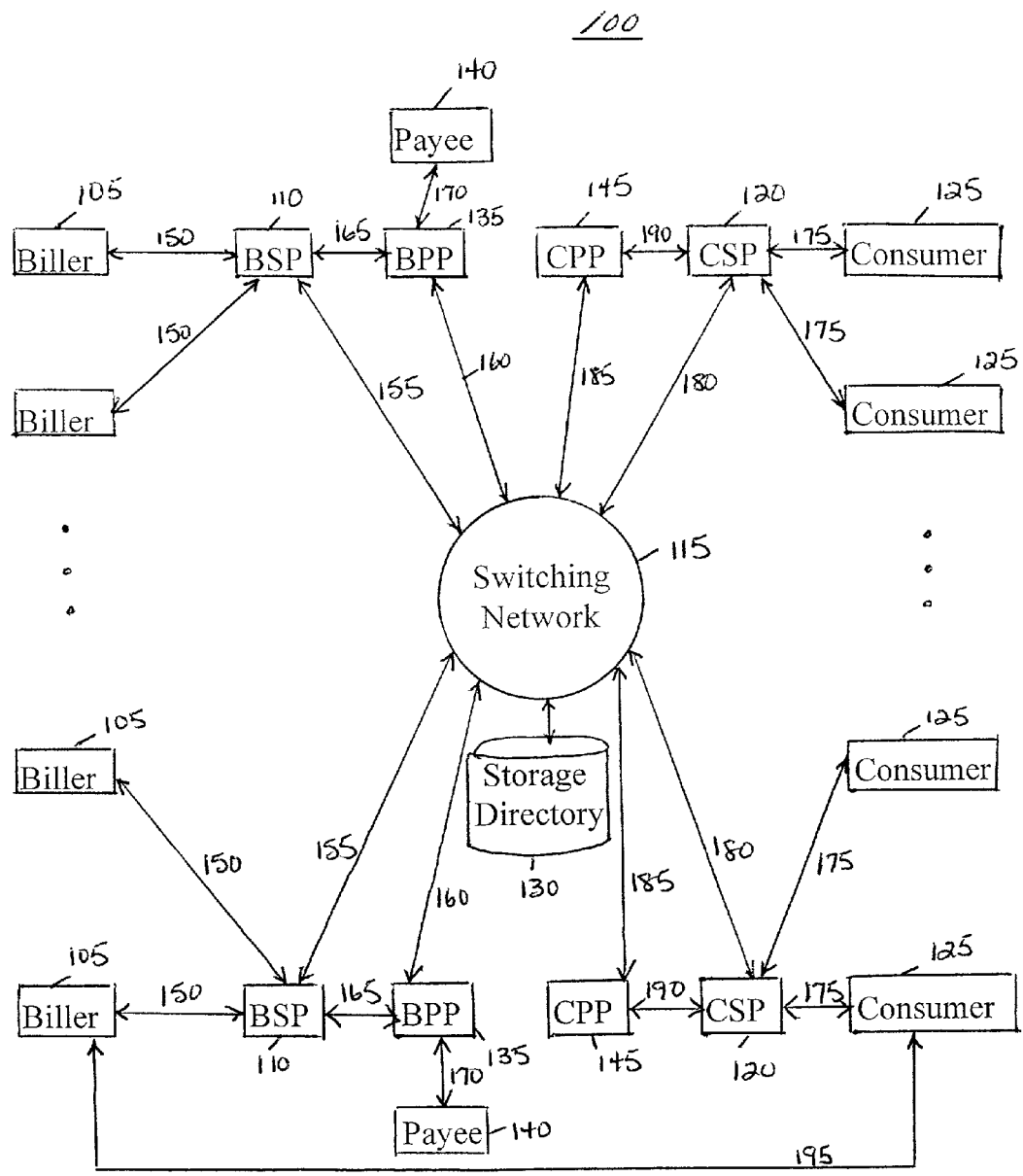
FIG. 1 is an exemplary representation of the switching system in accordance with the present invention.

FIG. 1 is an exemplary representation of the switching system 100 in accordance with the present invention that includes a switching network 115. By way of example, the switching system in FIG. 1 exchanges bill and payment information via a switching network 115 among Biller terminals 105, BSP devices 110, BPP devices 135, payee terminals 140, CPP devices 145, CSP devices 120, and Consumer terminals 125. Biller and Consumer terminals 105, 125 may be any type of computer, such as a personal computer, laptop, notebook, or personal digital assistant (PDA).

Figure 2:
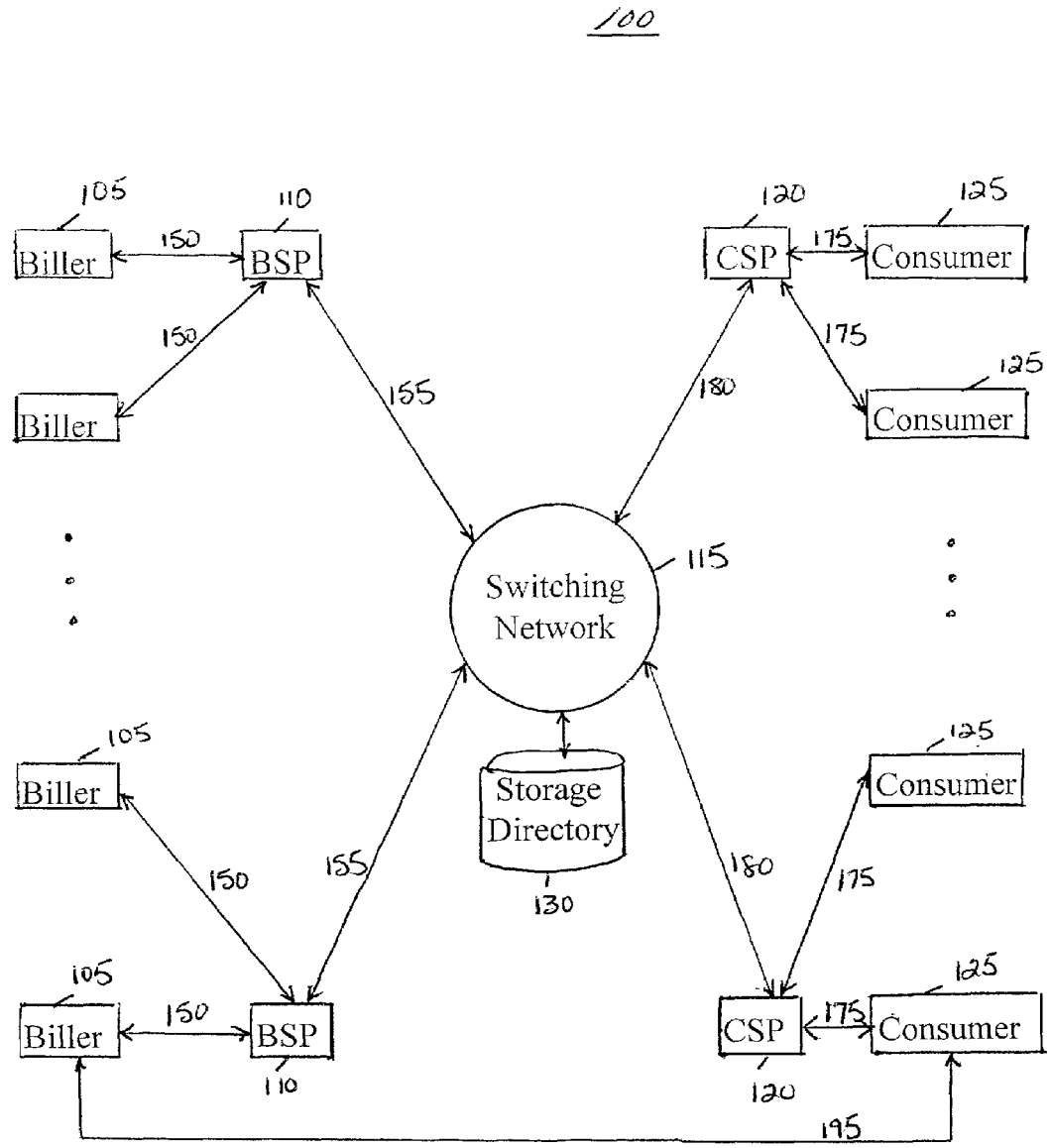
FIG. 2 is another exemplary representation of the switching system in accordance with the present invention.
Figure 3:
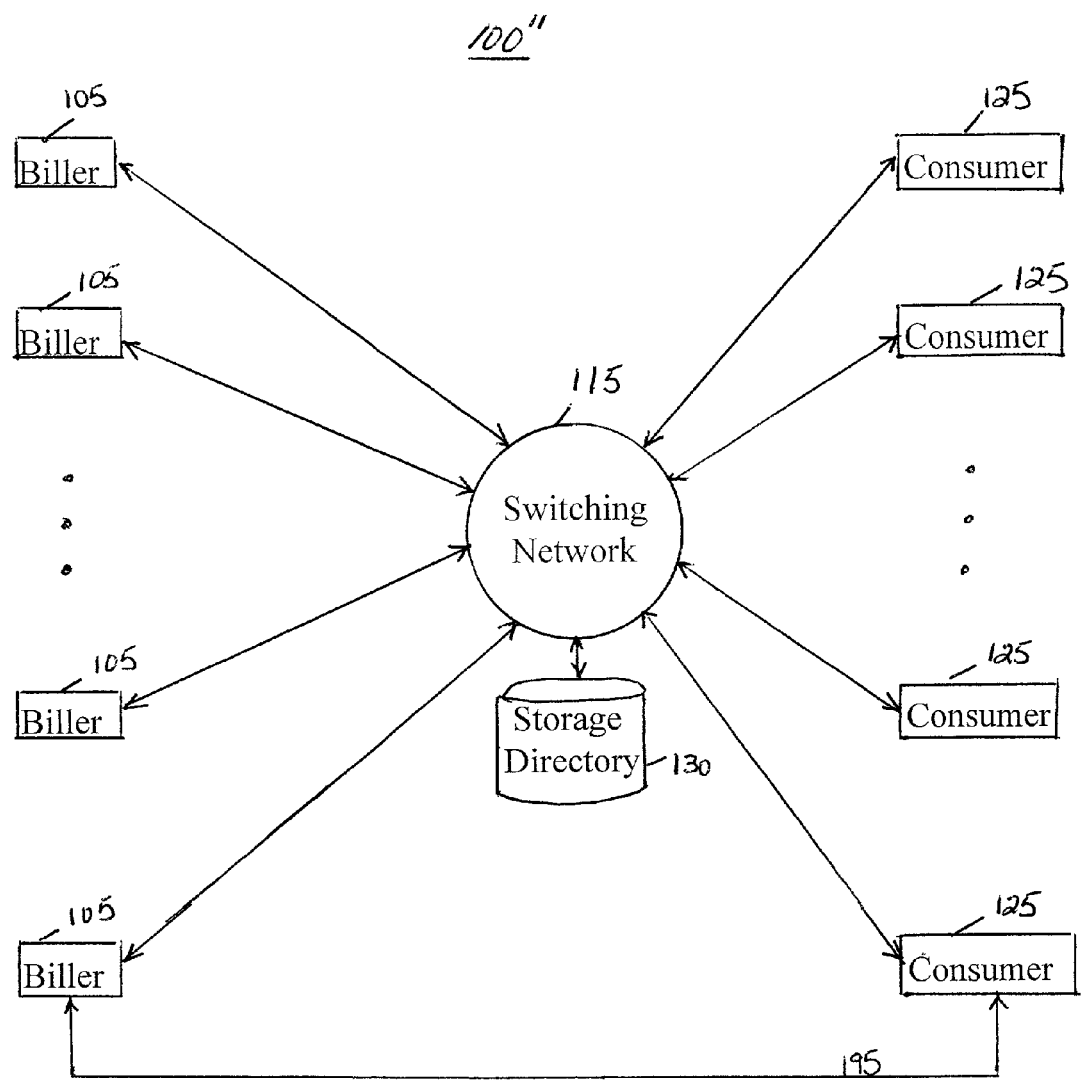
FIG. 3 is yet another exemplary representation of the switching system in accordance with the present invention.

FIG. 2 is an alternative embodiment of the system 100' in accordance with the present invention wherein Biller 105 and payees 140 are the same entity using a common terminal. Yet another alternative configuration for the switching system 100" in accordance with the present invention is shown in FIG. 3 in which the CSP and BSP devices have been eliminated so that the Consumer and Biller terminals communicate directly with the switching network 115. It is also contemplated that the system can be configured, as desired, to include one or more CSP or BSP devices, but not both.

Referring to FIG. 1, one or more CSP devices 120 and BSP devices 110 are electronically connected to the switching network 115. Consumer terminals 125 and Biller terminals 105 are, in turn, electronically connected to the CSP devices 120 and BSP devices 110, respectively. BPP devices 135 are connected between BSP devices 110 and the switching network 115. Payee 140 is in communication with the BPP 135. On the consumer side, CPP devices 145 are connected between CSP devices 120 and the switching network 115. In the exemplary embodiment shown in FIG. 1, the BSP devices 110 are separate from the BPP devices 135 and the CSP devices 120 are separate from the CPP devices 145. It is, however, contemplated and within the intended scope of this invention for BSP devices 110 and CSP devices 120 to perform payment acceptance and origination processing without employing separate BPP and CPP devices.

Switching network 115 is an open, interoperable routing device. It is "open" in that any financial institution or financial institution sponsored third party processor may become a Participant. Furthermore, the switching network is "interoperable" in that the consolidation of presentment and/or payment of bills may be accomplished using a single system. In a preferred embodiment the switching network 115 is an HTPP proxy server that uses a conventional message standard protocol, for example, Open Financial Exchange (OFX), Interactive Financial Exchange (IFX), or preferably a dual standard message environment supporting both OFX and IFX messages. Alternatively, any other type of message standard protocol for EBPP may be used. The system is flexible in that each Participant may use its own system and Participants need not use the same message standard in order to exchange information. For example, the CSP may use an OFX message standard and exchange information with a BSP that employs an IFX message standard.

Messages generated by Consumer terminal 125 or CSP device 120 are received by the switching network 115 that proxy (e.g., HTTP Protocol) routes them to the destination BSP device 110 or Biller terminal 105. Similarly, the Biller terminal 105 or BSP device 110 response messages are proxy routed back to the CSP device or Consumer terminal 125. The switching network 115 logs the presentment and payment messages as they are routed between the CSP/CPP and BSP/BPP for reporting on a periodic basis, e.g., daily and/or monthly, to the Participants.

Each time CSP device 120 initiates a transaction request through the switching network 115, the server associated with the switching network verifies the authenticity of the CSP, preferably by validating their certificates, as is known in the art. The switching network server validates that the CSP, BSP and Biller names are consistent with the source CSP and the destination BSP. Switching network 115 has an associated memory device 130 in which a directory, preferably a Lightweight Directory Access Protocol (LDAP), of all Participants is stored. The memory device 130 is shown in FIG. 1 as separate from the switching network 115 but may alternatively be an integral component thereof.

The three basic operations of the switching system 100 in accordance with the present invention are presentment, payment, and settlement of bills electronically. Presentment and payment operations may be implemented independently of one another so that the Consumer can access summary bill data without invoking the payment functionality, and vice versa. CSP devices, BSP devices and their associated Biller terminals must be registered Participants to access the switching network 115. Participants are connected to the switching network 115 via communication interface such as digital lines, the Internet, World Wide Web, Local Area Network, Wide Area Network or any other conventional connection or network.

A Consumer 125 logs on to their CSP's web site and submits via communication interface 175 a bill presentment request to be enrolled by a Biller for electronic presentment of bill summary data. Alternatively, this information may be received by e-mail, postal service, facsimile or any other conventional method of transmission. The CSPs, BSPs, and Billers served by the BSPs, in turn, must register with the switching network as a Participant. Information regarding all Participants is listed in a directory stored in the memory device 130. In the preferred embodiment in which the directory employs Lightweight Directory Access Protocol (LDAP), updated information concerning the Participants is preferably made using an LDAP Data Interchange Format (LDIF) file in batch mode. Each time a new Biller registers as a Participant or a registered Biller no longer wishes to be a Participant, the directory 130 is updated accordingly and transmitted to the CSP devices or Consumer terminals. In response to the bill presentment request initiated by the Consumer terminal, the BSP device on behalf of a Biller submits via communication interface 155, switching network 115, and communication interface 180 an activation response back to the Customer's CSP device 120 acknowledging receipt of the bill presentment request and providing the status of the request.

Presentment of Bills

Once the Consumer, Biller, and BSP are enrolled or registered with the system, the Consumer may access their bills on line. Bill presentment involves the aggregation, storage and transmission of billing information from businesses (Billers) to their customers (the Consumer). Switching network 115 acts as a transmission switch, receiving bills from a number of sources (Billers and/or their BSPs).

Initially in response to a Consumer request to access its bill summary data for a particular Biller, an activation request of the Consumer to be enrolled for electronic presentment of a bill for a product or service rendered is sent to the respective BSP device 110 or Biller terminal 105. The Biller terminal 105 or BSP device 110, in turn, transmits an activation response acknowledging receipt of the activation request and provides the status of the request.

Information concerning goods that have been purchased or services that have been rendered is transmitted by the Biller terminal 105 via communication interface 150 to the Biller's BSP device 110 that, in turn, extracts the necessary information therefrom, and generates a bill summary file in accordance with a format specified by the Biller. Alternatively, the bill summary file may be generated and formatted at the Biller terminal 105 and electronically transmitted via communication interface 150 to the BSP device 110. In a preferred embodiment, the bill summary data includes the Biller's name, payment due date, minimum amount due, and total amount due. The switching network 115 or switching system 100 does not require that the bill summary file be in any specified format or design. Instead, the format and design of the bill summary file is designed by the Billers and/or their respective BSP.

Figure 4:
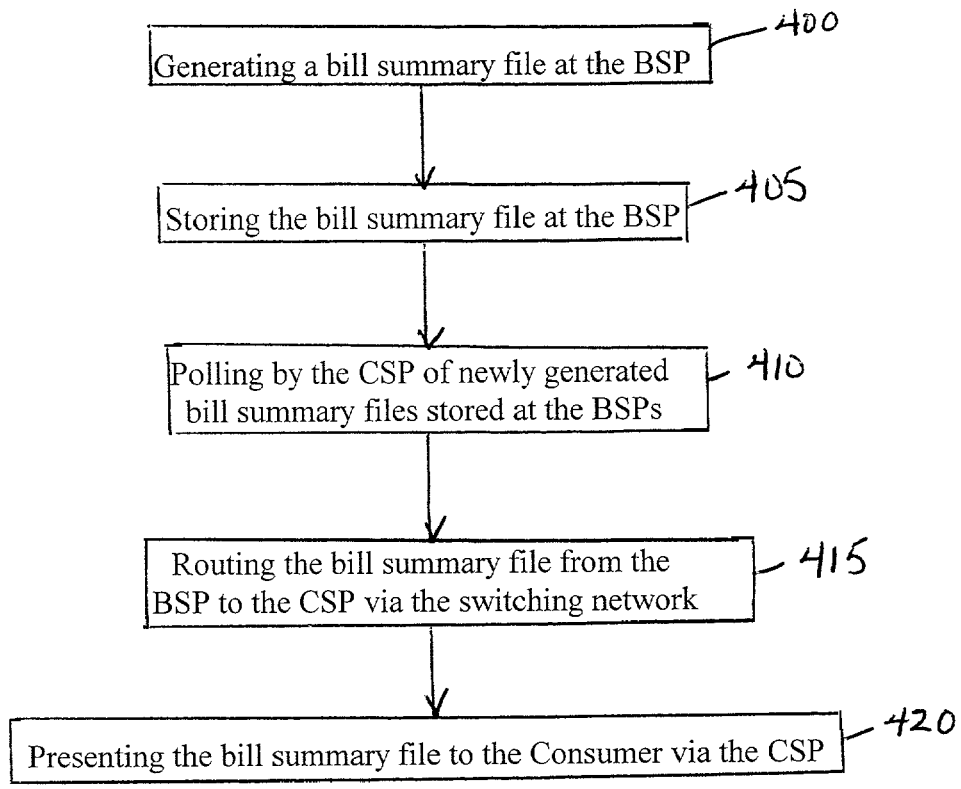
FIG. 4 is a flow chart of the presentment functionality of the switching system in accordance with the present invention.

FIG. 4 is a flow diagram of the bill presentment functionality in accordance with the present invention. In steps 400-405, bill summary files are stored by the BSP devices 110 in which they are generated. Periodically, for example, daily, in step 410 the CSP devices 120 poll the BSP devices 110 via communication interface 180, switching network 115, and communication interface 155 to retrieve from the memory devices of the BSP devices any newly generated bill summary files of their customers. The bill summary files retrieved from the BSP devices 110 are routed, without modification, in step 415, via communication interface 155, switching network 115, and communication interface 180 to the appropriate CSP device in accordance with the information stored in the directory 130. Bill summary files are stored at the respective CSP devices 120, but are not stored in the switching network 115. In step 420, the stored bill summary files are made available by the respective CSP devices at their web sites via communication interface 175 to their respective customers (Consumers 125). Consumers at their terminals 125 log on to the web site of their CSP to access their bill summary files. Detailed billing information is only accessible by the Consumer directly from the Biller, for example, by hyperlinking to the BSP's or Biller's web site, sending an e-mail message, calling, faxing, etc., but is not accessible via the switching network 115. By way of example, FIG. 1 shows a single communication interface 195 by which Consumer 125 may access detailed billing information from Biller 105, however, similar communication interfaces may be initiated between any Consumer and Biller.

Payment of Bills

Figure 5:
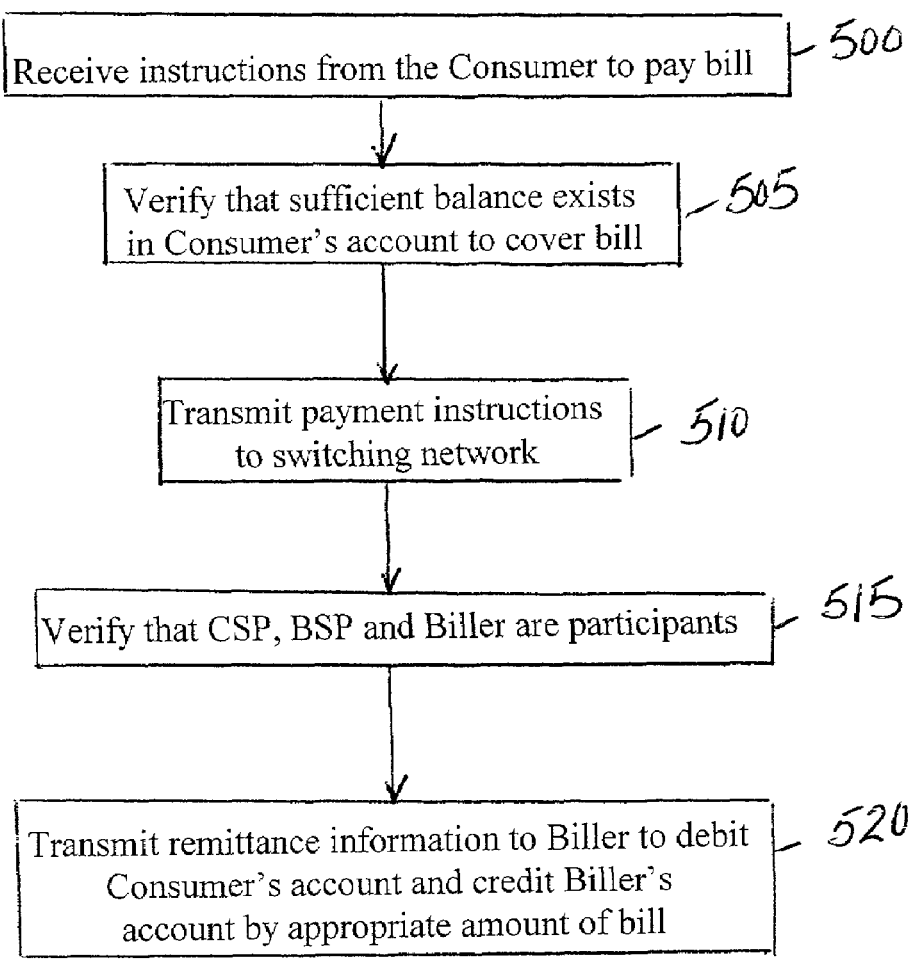
FIG. 5 is a flow chart of the payment functionality of the switching system in accordance with the present invention.

The switching system 100 in accordance with the present invention includes functionality that enables Consumers to electronically pay bills at Consumer terminal 125. FIG. 5 is a flow chart of the payment functionality of the switching system in accordance with the present invention. In a typical situation, the Consumer after having accessed the bill summary file, as described above, will select an icon or button that initiates payment of the bill (step 500). How the Consumer initiates payment of a bill is up to the CSP when designing their web site. In a preferred embodiment, an icon on the screen may be designed by the CSP to permit the Consumer to select from among several payment options. Once again the list of available payment options, the format and design of the screen are developed by the CSP. Possible options of payment made available by the CSP for its customers include: drawing from a transaction account, credit card payment, debit card payment, or any other alternative form of payment. Additional options that may be provided by the CSP to its customers include whether to pay the bill at the present time, on a recurring basis, or at some predetermined future date.

Payment requests received by the CSP device 120 are forwarded in real time via communication interface 190 to CPP device 145. In a preferred embodiment, all payments made electronically using the switching system in accordance with the present invention are verified by the CPP in step 505 to ensure that a sufficient balance exists in the Consumer's account prior to routing the transaction via communication interface 185 to the switching network 115 in step 510. In turn, switching network 115, in step 515, creates a remittance file and verifies that the CSP, BSP and Biller are Participants. After the CSP, BSP and Biller have been authenticated, the unique identifier of the Biller is obtained from the directory 130 associated with the switching network 115. Remittance information is forwarded from the switching network 115 to the respective BPP device 135 via communication interface 160 in step 520. BPP 135 also sends the remittance information via communication interface 170 to the payee 140. Thereafter, each BPP device may decide whether to forward the remittance information via communication interface 165 to the BSP device 110 that, in turn, sends a message to the individual Billers acknowledging payment of the bill.

Unlike the previously described scenario in which the Consumer instructs that a previously presented bill be paid, bills may also be paid electronically using the system in accordance with the present invention even if they have not been previously electronically presented, referred to as "pay-anyone functionality". This functionality allows the present inventive system to be "universal" in that the Consumer can pay all of their bills electronically using a single system. Specifically, customers of a participating CSP can make electronic payments that are not linked to a presented bill, thereby allowing customers of a participating CSP to pay another person without the presentation of a bill through the switching system, even when a debtor/creditor relationship between them does not exist. For example, the pay-anyone feature may be used to transfer money to a friend or relative in need of funds, to a child away in school, to make a charitable contribution or to make a purchase on the Internet.

Settlement System

In addition to offering electronic presentment of bill summary data, the service also provides net settlement functionality associated with the electronic payment of the bills for all transactions since the previous cut-off period. As payments are initiated by Consumer 125, switching network 115 debits the Consumer's account and credits the Biller's account by an appropriate amount. Switching network 115 settles all monetary transaction activity of Participants at a predetermined cut-off period, e.g., 2:00 p.m. of every business day, by determining the net amount of money owed and initiates a transfer of funds electronically between the CSP's account and the BSP's account. The BSP then debits the BSP's account and credits the appropriate Biller's account. For any particular cut-off period the total debits must equal the total credits. The switching network 115 processes payment instructions received from CSP participants but drawn on accounts at Participant or Non-Participant institutions. Any conventional batch clearing and settlement system, for example, the Automated Clearing House (ACH) network or federal wire, may be used to make the necessary remittance transactions after it has received final payment from a Consumer or its associated CSP. The ACH network is a nationwide system that processes electronic payments on behalf of depository financial institutions.

Switching network 115 logs the history of all transactions between Billers and Consumers. This history is retained for auditing purposes and used to generate reports to each participant. Remittance data is reported to each Participant, preferably on a daily and/or monthly basis, notifying them of the amount of money that has been debited or credited to their account.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A switching system for electronic presentment and payment of bills over a network, comprising: a first consumer service provider device which is in electronic communication with a first consumer terminal; a first biller service provider device which is in electronic communication with a first biller terminal; a second consumer terminal; a second biller terminal; and a switching network which is in electronic communication with said first consumer service provider device using one of a first message standard protocol and a second message standard protocol, with said first bill service provider device using one of said first and second message standard protocols, with said second consumer terminal using one of said first and second message standard protocols, and with said second biller terminal using one of said first and second message standard protocols, routing presentment information between said first consumer service provider or said second consumer terminal and said first bill service provider or said second biller terminal, said switching network being a multi-standard switch configured to facilitate electronic communication between said first consumer service provider or said second consumer terminal and said first bill service provider and said second biller terminal irrespective of which message standard protocol each of said first consumer service provider, said first bill service provider, said second consumer terminal, and said second biller terminal use.

2. A switching system as defined in claim 1, wherein said switching network routes information between said consumer service provider or said second consumer terminal and said bill service provider or said second biller terminal without reformatting.

3. A switching system as defined in claim 1, further comprising a second consumer service provider device which is in electronic communication with a third consumer terminal, said switching network being in electronic communication with said second consumer service provider device using a different one of said first and second message standard protocols than the one of said first and second message protocols which is used between said first consumer service provider and said switching network.

4. A switching system as defined in claim 1, further comprising a consumer payment provider device in electronic communication between said first consumer service provider device and said switching network.

5. A switching system as defined in claim 1, further comprising a second biller service provider device which is in electronic communication with a third consumer terminal, said switching network being in electronic communication with said second biller service provider device using a different one of said first and second message standard protocols than the one of said first and second message protocols which is used between said first biller service provider and said switching network.

6. A switching system as defined in claim 5, further comprising a biller payment provider device in electronic communication between said first consumer service provider device and said switching network.

7. A switching system as defined in claim 6, further comprising a payee terminal in electronic communication with said biller payment provider device.

8. A switching system as defined in claim 4, further comprising an associated memory device in which a directory of said first consumer service provider device, said first bill service provider device, said second consumer terminal, and said second biller terminal is stored, wherein said first consumer service provider device, said first bill service provider device, said second consumer terminal, and said second biller terminal must each be registered in said directory in order to access said switching network.

9. A switching system for electronic presentment and payment of bills over a network, comprising: a consumer terminal; a biller terminal; and a switching network which is in electronic communication with said consumer terminal using one of a first message standard protocol and a second message standard protocol and with said biller terminal using one of said first and second message protocols, exchanging billing information between said consumer terminal and said biller terminal irrespective of which message protocol each of said consumer terminal and said biller terminal use, said switching network routing bill summary data generated by said biller terminal for presentment at said consumer terminal, complete bill data being accessible only by direct communications between said consumer terminal and said biller terminal.

10. A switching system as defined in claim 9, wherein said switching network routes information between said consumer terminal and said biller terminal without reformatting.

11. A switching system as defined in claim 9, further comprising a consumer service provider device in electronic communication between said consumer terminal and said switching network.

12. A switching system as defined in claim 11, further comprising a consumer payment provider device in electronic communication between said consumer service provider device and said switching network.

13. A switching system as defined in claim 9, further comprising a biller service provider device in electronic communication between said biller terminal and said switching network.

14. A switching system as defined in claim 13, further comprising a biller payment provider device in electronic communication between said biller service provider device and said switching network.

15. A switching system as defined in claim 14, further comprising a payee terminal in electronic communication with said biller payment provider device.

16. A switching system as defined in claim 12, further comprising an associated memory device in which a directory of said consumer terminal and said biller terminal is stored, wherein said consumer terminal and said biller terminal must each be registered in said directory in order to access said switching network.

17. A method for electronic presentment and payment of bills over a network, comprising: providing a switching network for facilitating electronic presentment and payment of bills; establishing electronic communication between said switching network and first and second biller terminals and first and second consumer terminals, said switching network being a multi-standard switch configured to communicate with said first and second biller terminals and said first and second consumer terminals in either of at least first and second message standard protocols, said switching network communicating with at least one of said first and second biller terminals and said first and second consumer terminals using said first message standard protocol and at least one of said first and second biller terminals and said first and second consumer terminals using said second message standard protocol; generating bill summary data from complete bill data provided by each of said first and second billing terminals; selectively routing portions of said bill summary data via the switching network to present appropriate portions of said bill summary data to said first and second consumer billing terminals.

18. A method as defined in claim 17, wherein electronic communication between said switching network and said first consumer terminal is established through a first consumer service provider device, and wherein electronic communication between said switching network and said second consumer terminal is established through a second consumer service provider device.

19. A method as defined in claim 17, wherein said routed bill summary data is not reformatted by said switching network.

20. A method as defined in claim 17, further comprising accessing complete bill data for a particular bill only by communicating directly between the one of said first and second consumer terminals seeking said complete bill data for said particular bill and the one of said first and second biller terminals having complete bill data for said particular bill.

21. A method as defined in claim 17, further comprising the steps of storing a directory of consumer terminals which are registered with said switching network in an associated memory device; generating payment instructions from said first and second consumer terminals; transmitting said payment instructions which are generated by said first and second consumer terminals to said switching network; verifying that said payment instructions are from consumer-terminals which are registered with said switching network; and if said payment instructions are from consumer terminals which are registered with said switching network, causing said payment instructions to be executed.

22. A method as defined in claim 21, wherein prior to said step of causing said payment instructions to be executed said switching network verifies that a sufficient balance exists in a financial account associated with each consumer terminal from which payment instructions are received to cover the bill being paid.

23. A method as defined in claim 22, further comprising the step of settling all payment transactions over a predetermined cut-off period.

24. A method as defined in claim 17, wherein said wherein electronic communication between said switching network and said first biller terminal is established through a first biller service provider device, and wherein electronic communication between said switching network and said second biller terminal is established through a second biller service provider device.

25. A switching system for electronic presentment and payment of bills over a network, comprising: a first consumer terminal; a second consumer terminal; a first biller terminal; a second biller terminal; and a switching network in electronic communication with said first and second consumer terminals and said first and second biller terminals, said switching network for routing presentment information from said first and second biller terminals to said first and second consumer terminals and payment information from said first and second consumer terminals and said first and second biller terminals, said switching network being a multi-standard switch configured to communicate with said first and second consumer terminals and said first and second biller terminals in either of first and second message standard protocols, said switching network communicating with at least one of said first and second consumer terminals and said first and second biller terminals using said first message standard protocol and at least one of said first and second consumer terminals and said first and second biller terminals using said second message standard protocol.

26. A switching system as defined in claim 1, wherein said first message standard protocol comprises the Open Financial Exchange ("OFX") standard protocol and said second message standard protocol comprises the Interactive Financial Exchange ("IFX") standard protocol.

27. A switching system as defined in claim 1, wherein said switching network routes bill summary data generated by said biller service provider device or by said first or second biller terminals for presentment at said first or second consumer terminals, complete bill data being accessible only by direct communications between said first or second consumer terminals and said biller service provider device or said first or second biller terminals.

28. A switching system as defined in claim 1, wherein said switching network is arranged and configured to provide net settlement functionality by debiting financial accounts associated with consumers associated with said first and second consumer terminals and crediting the financial accounts of billers associated with said first and second biller terminals by appropriate amounts.

29. A switching system as defined in claim 1, wherein said switching network is arranged and configured to log all presentment and payment communications as they are routed for reporting on a periodic basis.

* * * * *